Feb. 27, 1962 — A. O. REYNOLDS — 3,022,605
METHOD OF PACKING SEEDLING PLANTS FOR SHIPMENT
Filed May 11, 1959
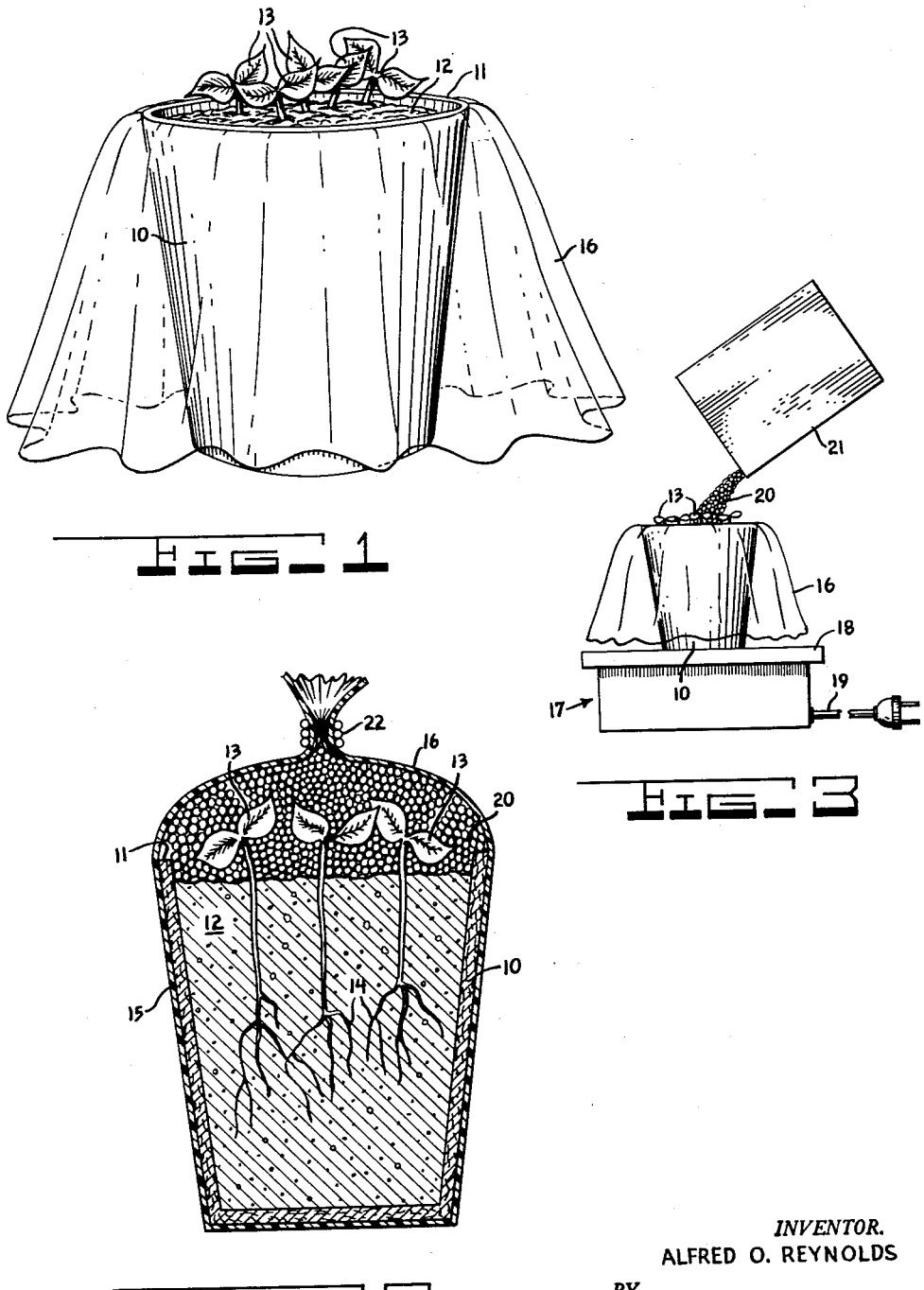
INVENTOR.
ALFRED O. REYNOLDS
BY Harold B. Hood
ATTORNEY

United States Patent Office 3,022,605
Patented Feb. 27, 1962

3,022,605
METHOD OF PACKING SEEDLING PLANTS
FOR SHIPMENT
Alfred O. Reynolds, Indianapolis, Ind.
(315 Ballard St., Lebanon, Ind.)
Filed May 11, 1959, Ser. No. 812,413
3 Claims. (Cl. 47—58)

This invention relates to the packing of seedling plants for shipment.

It is well known that, as a rule, the amateur gardener experiences difficulty in obtaining a high percentage of germination when growing plants from seeds. This is due to a number of causes, for instance, inexperience, lack of facilities such as good potting soil and containers, poorly controlled temperature and light conditions, poor watering technique, lack of attention, etc.

In the past, this has not been a matter of great importance. Seeds have been a cheap commodity and if a relatively large percentage of them were wasted, no serious financial loss was incurred.

With the advent of the hybrid seed, however, this picture has undergone a substantial change. There is now increasing emphasis on these seeds which produce plants of extraordinary beauty and/or utility, and which are very expensive. When handling such seeds, the rate of germination is a matter of serious concern, for financial reasons, even when dealing with the relatively small quantities that are normally involved in amateur gardener activities.

Because of this situation, it would be desirable for the amateur to purchase the seed already germinated. He can of course, purchase partly grown plants of say, four to eight weeks of age, known in the trade as "bedding plants." The price of such plants must necessarily reflect the professional grower's costs in providing space for and caring for the plants during the growing period. Where comparatively long distance shipment is involved, the relatively high expense of providing suitable packaging, and transportation charges on both the relatively large plant and the package, must be added to the original price of the plant.

It would appear that there would be advantages to selling very young seedlings, germinated, for example, only a few days, to the amateur. Thus, the best possible rate of germination can be secured by the professional grower, and the plants will be received by the amateur without having incurred the added costs of growing for an extended period of time. This should work out well where only a local operation is involved; that is, where the customer receives the plants at the grower's premises, or where only a local truck delivery is required, so that the container in which the plants are growing will not be tipped unduly or otherwise handled roughly.

Where public transportation must be used, the shipment of plants of any size becomes somewhat more complicated than where only local delivery is involved. In this case, the plants with their containers and soil or other similar growing medium, must be prepared for shipment so as to withstand damage of any kind which might result from being tipped, or even from remaining for extended periods of time in any position. Furthermore, the unit must be able to withstand relatively severe shocks while in any position. The package must also resist excessive loss of moisture through evaporation during the shipping period.

In the case of larger plants, where normally there is only one plant in each container, the problems involved in shipping by public carrier have been worked out quite satisfactorily. In such cases, extensive root development has taken place, which tends to create a root ball having very considerable cohesion. This plant can satisfactorily be prepared for shipment by wrapping in newspaper, or possibly plastic sheeting, with the root ball either left in its growing container or placed in a special shipping container, or even wrapped without a container. In addition, various devices have been developed which fit around the container or root ball and which may have notched flaps which fold down around the stem of the plant, thus holding the plant gently and securely while also holding the growing medium and/or root ball in place. These function quite satisfactorily.

The small seedlings, however, present more serious problems. Because of their small size and because of the desirability of minimizing the cost, it is not practical to provide a separate container for each individual plant, or even one container for two or three plants. Each container must hold a plurality of plants. Furthermore, root development is not sufficient to impart any appreciable cohesion to the potting soil. It is therefore necessary to restrain the soil or similar growing medium from coming out of the container, and even the small seedlings from coming out of the soil, as a result of the handling to which the package is subjected during shipment as, for instance, in a mail sack. The term "seedlings" as used in the present disclosure and in the claims appended hereto is intended to refer to such infant plants, germinated only a few days, as distinguished from larger plants, several weeks old.

It is the objective of the present invention to overcome the difficulties in shipping small seedlings, as enumerated above. It is my idea that this can be accomplished by using an extremely light, semi-rigid, more or less finely divided substance. This substance is poured gently onto the seedlings which are growing in a normal growing medium which is contained in a container suitable for shipment. It is desirable that the sides of such container extend upward above the level of the growing medium, as would normally be the case anyway. While the substance is poured gently onto the seedlings, the container should be mildly agitated. This causes the substance to be disposed or distributed underneath and around the seedlings without crushing them or materially altering their positions. The addition of said substance continues until the seedlings are completely covered and said material is mounded up above the level of the top of the container. The whole container is then enveloped in a thin and highly flexible membrane in such a way that the edges and corners of the membrane may be brought together over the top of the container and the mounded-up substance. The material of the membrane is then pinched together until it exerts gentle but firm pressure on the mounded substance, and is then secured in that position by a suitable fastening. The package thus formed may then be further wrapped or packaged for shipment, as thought prudent by the shipper, according to conventional procedures.

To the accomplishment of the above and related objects, my invention may be embodied in the form of package illustrated in the accompanying drawings and in the steps described in the following specification, attention being called to the fact, however, that the drawings are illustrative only and that the specific procedure described is by way of illustration only and that change may be made in the specific construction illustrated and described or in the specific steps stated, so long as the scope of the appended claims is not violated.

FIG. 1 is a perspective view of a pot containing seedlings growing in a suitable medium, said pot being provided with a jacket or shroud of suitable flexible material whose edge regions loosely drape away from the pot;

FIG. 2 is a vertical section through a completed package conforming to the present invention, showing the shroud edge regions gathered together and fastened to retain the mass of discrete particles against significant movement relative to the pot; and FIG. 3 is an elevation, more or less diagrammatic in character, illustrating a step in the process of producing the package of the present invention.

In the drawings, the reference numeral 10 indicates a suitable container which may be of almost any character but which preferably will be a pot formed primarily of matted, vegetable fibrous material which is impervious to air and which is capable of holding a substantial degree of moisture. In accordance with conventional practice, the pot 10 is filled with a suitable growing medium 12, the upper surface of which is disposed a significant distance below the rim 11 of the pot. Again in accordance with conventional practice, a plurality of seeds will be planted in the growing medium 12; and the drawings illustrate the condition which will be attained within a few days after germination, in which foliage 13 has extended slightly above the surface of the growing medium and a root system 14 has started to develop, but has not developed to a sufficient extent to provide any substantial degree of cohesion within the mass of the growing medium 12.

A thin, flexible membrane 15 is perimetrally secured to the pot in a region which extends below the pot rim, and provides an edge region 16 of substantial dimensions which is loose with respect to the pot. In the illustrated and preferred form of the invention, the membrane consists of a single sheet which adherently envelops the entire external surface of the bottom and side walls of the pot, and preferably the membrane is substantially moisture proof.

With the unit in the condition illustrated in FIG. 1, a mass 20 of suitable discrete particles is gently poured, for instance from a container 21, into the pot and is distributed over the entire top surface of the growing medium 12. Preferably, the pot is subjected to gentle agitation during this pouring step to assist in the uniform distribution of the particles of the mass 20, so that those particles snugly surround and engage the stems of the seedlings, snugly underlie the leaves and snugly overlie the leaves to embed the upstanding foliage completely and uniformly. The particles 20 will be delivered to the pot in sufficient quantity to be mounded up completely over the tops of the seedling foliage, the portions 16 of the membrane 15 being turned upwardly, if necessary, to retain the mass of particles as the mound is built; and preferably the particle mass will be permitted to overflow the pot rim 11 in the manner illustrated in FIG. 2.

One suitable means for gently agitating a pot as the particles 20 are poured thereinto to accomplish the desired uniform embedment of the seedling foliage is suggested in FIG. 3 in which I have indicated a commercial form of electrically-driven vibrator 17 which includes a movable table 18 upon which the pot 10 may be supported while the particles 20 are being poured thereinto, and a conventional electric connection 19.

Because of the character of the light, somewhat compressible particles 20, a gentle vibration imparted to the pot through the unit 17 during the pouring of such particles thereinto will distribute the particles uniformly to provide the desired solid engagement of the particle mass with the entire top surface of the growing medium 12 and the desired snug embedment of the stems and leaves of the seedlings.

When the foliage has been completely embedded and covered, the edge regions 16 of the membrane 15 are gathered together over the top of the mass 20 and are drawn snugly into retaining engagement with the top of that mass; and then those regions are secured in place by any suitable means such as, for instance, a cord or or wire 22 tightly wrapped about the gathered membrane portion. In thus completing the closure of the package, care is taken to pull the membrane regions 16 down snugly into overlying engagement with the mass 20 so that the particles of that mass are retained against any substantial movement relative to each other and the mass is retained against any significant movement with respect to the pot. Since the membrane holds the mass 20 against movement with respect to the pot and since the mass bears directly against the entire area of the top surface of the growing medium 12, that medium is firmly held against any shifting within the pot and against dislodgment from the pot. Since the membrane 15 is substantially proof against the passage of water therethrough, almost no evaporation of moisture will occur during long periods, so long as the package is not opened.

It is important that said substance 20 be extremely light, and semi-rigid as mentioned above. It should have a little give to it, so that it will be gentle to the seedlings 13. It should have a fairly uniform particle size which should be smaller than the leaves, and small enough so that the mass of discrete material can, under gentle agitation during introduction of the material, snuggle its way beneath the leaves and into close surrounding relation to the seedling stems to support the stems against sharp bending and breakage during handling of the final package. It must be soft enough so that parts of the plants will not be crushed or bruised between the particles. On the other hand, too much elasticity or compressibility must be avoided. Once the portion 16 of the membrane 15 is secured, the whole unit must be highly resistant to motion of its parts relative to each other. Such motion within the growing medium 12 or within the mass of the mounded-up substance 20 could result in sufficient motion in the seedlings 13 to cause breakage. Rubbing action of the particles could cause abrasion and consequent damage to the plant and therefore should be prevented. Undue compressibility can cause a lessening of the pressure against the growing medium 12, and it could thus be permitted to shift its position, thus loosening the roots 14 of the seedlings. Such action could also lead to a tendency for said substance 20 and the growing medium 12 to intermingle.

It is highly desirable that the membrane 15 used have a high resistance to passage of moisture. One reason, of course, is that high moisture retention within the package will have a major effect in keeping the seedlings in good condition during shipment. Another important reason is that if the moisture content can be properly adjusted at time of packing, and the package then sealed so that the moisture content will remain uniform during shipment, an optimum condition for success of this method of packing is created. If the soil 12 is made too wet at the start in order to allow for drying in transit, it will be runny and will tend to intermingle with the packing substance 20. If the soil should become unduly dry during shipment, it might become granular and intermingle with the packing substance 20.

Experiments carried out to date indicate that polystyrene expanded beads are well adapted for use as the finely divided packing substance 20, and that such beads prepared to have a density on the order of two pounds or less per cubic foot are optimum. Preliminary tests in which small seedlings packed as described have been subjected to the type of treatment which one would normally expect the package to encounter in normal parcel post handling have yielded satisfactory results. While it is recognized that there may be other suitable materials, possibly some more satisfactory, it is merely stated here that polystyrene expanded beads constitute one specific material which may be used to the accomplishment of the present invention, and the best material now known to me for that purpose.

In a co-pending application of Alfred O. Reynolds, Richard H. Plow and Charles W. Snyder, Serial No. 809,870, filed April 29, 1959, a peat moss pot having a polyethylene film jacket completely encasing the sides and bottom of the pot and extending upward beyond the top of the pot is described. While the present invention is not limited to the use of such a pot and jacket combination, it is apparent that its use with this invention would be an ideal combination; and therefore the pot 10 and jacket 15 herein illustrated may be considered to be the same as the pot and jacket disclosed in said co-pending application as an optimum form of means for use in the invention disclosed herein. The pot 10 comprises a reservoir for providing moisture and nutrient, and also has a stabilizing effect on the moisture condition. The pot, when combined with the jacket 15, provides excellent strength to withstand any abuses which may be encountered in transit. The extra plastic film portion 16 extending beyond the pot rim 11 provides an excellent means of securing the packing substance 20 in place. The whole plastic covering is tightly sealed and being polyethylene, provides means of almost completely eliminating loss of moisture due to evaporation.

I claim as my invention:

1. The method of packing for shipment seedling plants which have grown in a growing medium contained in a pot until foliage has appeared above the top surface of such medium, said method comprising the steps of embedding such foliage, before the plant root system has imparted any significant cohesion to such medium, in a mass of discrete particles having a density substantially less than that of such growing medium, such mass bearing upon the entire top area of such growing medium, and thereafter confining such mass against any significant movement relative to said pot.

2. The method of claim 1 in which said mass of discrete particles consists primarily of polystyrene expanded beads.

3. The method of claim 1 in which said mass is made up of yieldable particles uniformly smaller than the width of the leaves of such foliage.

References Cited in the file of this patent

UNITED STATES PATENTS

| 1,785,101 | Sutherland | Dec. 16, 1930 |
| 2,688,431 | Loeb | Sept. 7, 1954 |

FOREIGN PATENTS

| 1,112,365 | France | Nov. 16, 1955 |

OTHER REFERENCES

Washington (D.C.) Sunday Star (newspaper), published January 10, 1954, page C-8, article "New Help for Gardeners."

New York Times, Sunday, July 22, 1956, page 38X, Gardeners Section, article "Around the Garden," by Dorothy H. Jenkins.